United States Patent Office 2,971,937
Patented Feb. 14, 1961

2,971,937

FIBER FORMING COMPOSITION CONTAINING ACRYLONITRILE POLYMER AND ACRYLONITRILE N-VINYLPYRROLIDONE COPOLYMER

George E. Ham and Alfred B. Craig, Decatur, Ala., assignors to The Chemstrand Corporation, Decatur, Ala., a corporation of Delaware No Drawing. Filed May 29, 1953, Ser. No. 358,536

7 Claims. (Cl. 260—45.5)

This invention relates to new and valuable fiber-forming compositions. More specifically the invention relates to acrylonitrile polymers capable of being dyed by conventional procedures especially with acid dyestuffs.

This application is a continuation-in-part of our copending application, Serial No. 206,916, filed January 19, 1951, now abandoned.

It is well-known that polyacrylonitrile and copolymers of acrylonitrile and other mono-olefinic polymerizable monomers are excellent fiber forming copolymers. The polyacrylonitrile and copolymers of more than 75 percent acrylonitrile and up to 25 percent of other polymerizable monomers produce fibers with superior tensile properties, desirable elongation, and excellent stability under a wide range of physical and chemical conditions. These polymers are subject to inherent disabilities which greatly restrict the utility in the fabrication of general purpose fibers. For example, the fibers do not have sufficient dye affinity to enable the development of satisfactory colored fibers, and the limited range of colors produced by conventional dyeing techniques are not stable to laundering and dry-cleaning procedures.

The purpose of this invention is to provide a new and valuable general purpose fiber. A further purpose of the invention is to provide fiber forming acrylonitrile polymers which are dye-receptive by conventional procedures. A still further purpose of the invention is to provide a convenient means for modifying non-dye receptive acrylonitrile polymers and converting them into polymers with excellent dye affinity without depreciating the properties of the fibers produced therefrom.

It has been found that non-dyeable fiber forming polymers and copolymers of the prior art, such as polyacrylonitrile and copolymers of 95 percent of acrylonitrile and five percent vinyl acetate may be made into dyeable form by the incorporation of substantial proportions of polymers of N-alkenyllactams.

The prior art acrylonitrile polymers which may be modified by the incorporation of polymers of N-alkenyllactams are polyacrylonitrile, and copolymers of 75 percent or more of acrylonitrile and up to 25 percent of monomers, such as vinyl acetate and other vinyl esters of monocarboxylic acids having up to four carbon atoms, methyl methacrylate, and other alkyl methacrylates having up to four carbon atoms in the alkyl radical, methyl acrylate and other alkyl acrylates having up to four carbon atoms in the alkyl groups, dimethyl fumarate and other dialkyl fumarates having up to four carbon atoms in the alkyl groups, dimethyl maleate and other dialkyl maleates having up to four carbon atoms in the alkyl groups, styrene, α-methylstyrene, and other vinyl or isopropenyl substituted aromatic hydrocarbons, vinyl chloroacetate and other vinyl esters of halo substituted acetic acids, vinylidene chloride, and methacrylonitrile. These polymers and copolymers are, in general, of negligible dye receptivity.

In the practice of this invention, polymers of N-alkenyllactams are separately prepared and intimately mixed with the non-dyeable acrylonitrile polymers. The resulting blends will be spinnable by conventional methods into fibers which are receptive to dyes, particularly acid dyes, by conventional dyeing procedures.

As examples of N-alkenyllactams which have been found useful in the preparation of the blends of this invention may be mentioned N-vinylpyrrolidone, N-allylpyrrolidone, N-methallylpyrrolidone, N-vinylpiperidone, N-allylpiperidone, N-methallylpiperidone, 1-allyl-4-methylpiperidone, N-vinylcaprolactam, 1-vinyl-5-pyrazolone, 1 - methyl - 3 - vinyl-5-pyrazolone, 1-methyl-3-allyl-5-pyrazolone, 4-vinyl-5-pyrazolone, or other N-alkenyllactam, wherein the alkenyl group contains up to four carbon atoms.

The polymers of N-alkenyllactams may be the homopolymer, or they may be copolymers of N-alkenyllactams and a wide variety of olefinic monomers copolymerizable therewith. Useful monomers for effecting this polymerization are styrene, α-methylstyrene, vinyl chloride, vinylidene chloride, vinyl acetate, acrylonitrile, methacrylonitrile, acrylic acid, methacrylic acid, maleic anhydride, the alkyl acrylates, the alkyl methacrylates, vinyl ethers, alkyl crotonates, the alkyl maleates, the alkyl fumarates, butadiene, isoprene, and chloroprene. Since the copolymers of N-alkenyllactams and acrylonitrile have good thermal stability and solvent resistance, these copolymers are usually preferred. The copolymers are added in such proportions that from two to 15 percent of the total monomers in the blended composition is N-alkenyllactam. The copolymer should contain at least 30 percent N-alkenyllactam and up to 70 percent of the other monomer.

The polymers and copolymers of N-alkenyllactams may be prepared by mass, solution, or emulsion polymerization procedures in the various manners well-known to the art. A preferred method of polymerization involves a reaction in aqueous medium in the presence of suitable dispersing agents and suitable free radical producing catalysts.

In the preparation of the emulsion copolymers of N-alkenyllactams it has been found that a wide variety of emulsion stabilizing agents may be used, but the alkali metal salts of formaldehyde condensed sulfonic acids, and various alkali metal salts of fatty acids and fatty acid mixtures have been unusually successful. As catalysts, various peroxides, both oil and water-soluble types, as well as azo derivatives may be used.

The non-dyeable fiber-forming polymers and the N-alkenyllactam polymers may be blended by any conventional liquid or solid mixing machine, for example, Banbury mixers, roll mills or dough mixers. Although the mixing may take place at elevated temperatures where the polymers are soft solids or in semi-liquid state, it is preferred to add suitable solvents or plasticizers to achieve the same state at lower temperatures. Suitable solvents for blending the acrylonitrile fiber-forming polymers and the dyeable N-alkenyllactam polymers are N,N-dimethylformamide, N,N-dimethylacetamide, α-butyrolactone, ethylene carbonate, and N,N-dimethylmethoxyacetamide. These various solvents are added in sufficient proportions to render the mixed solids liquid or plastic; in which condition thorough intimate mixing of the solid components is more easily effected. In general, from 50 to 90 percent of the solvent will produce the desired semi-liquid or soft solid state.

In the preparation of the blended polymers the quantity of each component will depend upon the amount of N-alkenyllactam desired in the final composition and upon the proportion of N-alkenyllactam in the N-alkenyllactam polymer. In general, from two to 30 percent of the blending composition with from 98 percent to 70 percent of the non-dyeable polymer will include the most useful proportions.

The blended compositions are fabricated into synthetic fibers by conventional wet and dry spinning methods. After stretching the fibers of the blended acrylonitrile polymers to develop the necessary orientation in the fiber and the incidental tensile strength, and thereafter heat shrinking to improve their resistance to elevated temperatures, valuable general purpose fibers are thereby obtained.

Further details of the practice of this invention are set forth with respect to the following examples:

Example I

A mixture of 50 parts by weight of N-vinylpyrrolidone and 50 parts of acrylonitrile was added over the period of 2½ hours to 135 parts of water containing two percent by weight of sodium stearate and one percent of the sodium salt of formaldehyde condensed naphthalene sulfonic acid contained in a two-liter three-necked round-bottom flask fitted with a reflux condenser and stirrer, at 95° C. After steam distillation of unreacted monomers, the emulsion was frozen, thawed, filtered, and the recovered copolymer was dried. A yield of 99 percent of copolymer was obtained.

A blend of this copolymer with a copolymer of 97 percent acrylonitrile and 3 percent vinyl acetate (with an overall N-vinylpyrrolidone content in the blend of 10%) was spun from a 16 percent solution in N,N-dimethylacetamide into a mixture of 60 percent N,N-dimethylacetamide and 40 percent water, and the fibers were washed continuously with water and stretched 383 percent. The fibers dyed well with Wool Fast Scarlet G Supra (at both 2 percent and 10 percent dye, both concentrations each with 10 percent sulfuric acid based on fiber weight) and possessed a tenacity of 3.6 grams/denier and an elongation of 6.8 percent.

Example II

A copolymer of 50 percent acrylonitrile and 50 percent N-vinylcaprolactam was prepared as in Example I. A blend of this copolymer and a copolymer of 97 percent acrylonitrile and 3 percent vinyl acetate (with a total N-vinylcaprolactam content of 10 percent) was spun from a 16 percent solution in N,N-dimethylacetamide and fibers were stretched 310 percent. These fibers showed an affinity for Wool Fast Scarlet G Supra.

When N-vinylpiperidone, N-allylpyrrolidone and N-methallylpiperidone are substituted for the N-vinylcaprolactam in the above example, fibers showing an affinity for acid dyes were likewise obtained.

We claim:

1. A dyeable fiber forming composition comprising a blend of a polymer of at least 75 percent acrylonitrile and up to 25 percent of another polymerizable mono-olefinic monomer, and a copolymer of from 30 to 90 percent by weight of N-vinylpyrrolidone and 10 to 70 percent of acrylonitrile, the components of the blend being so proportioned as to provide from 2 to 10 percent of N-vinylpyrrolidone in polymeric form, based on the total weight of polymerized monomers in the blended polymer.

2. A dyeable fiber forming composition comprising a blend of a copolymer of at least 75 percent by weight of acrylonitrile and up to 25 percent of vinyl acetate and a copolymer of 30 to 90 percent by weight of N-vinylpyrrolidone and 10 to 70 percent of acrylonitrile, the components of the blend being so proportioned as to provide from 2 to 10 percent of N-vinylpyrrolidone in polymeric form, based on the total weight of polymerized monomers in the blended polymer.

3. A dyeable fiber forming composition comprising a blend of a copolymer of 97 percent by weight of acrylonitrile and 3 percent of vinyl acetate and a copolymer of 50 percent by weight of acrylonitrile and 50 percent of N-vinylpyrrolidone, said copolymers being so proportioned that from 2 to 10 percent of the total monomers in polymeric form is N-vinylpyrrolidone.

4. A dyeable fiber forming composition comprising a blend of a copolymer of 93 percent by weight of acrylonitrile and 7 percent of vinyl acetate and a copolymer of 54 percent by weight of acrylonitrile and 46 percent of N-vinylpyrrolidone, said copolymer being so proportioned that 2 to 10 percent of the total monomers in polymeric form is N-vinylpyrrolidone.

5. A dyeable fiber forming composition comprising a blend of polyacrylonitrile and a copolymer of from 30 to 90 percent by weight of N-vinylprrolidone and from 10 to 70 percent of acrylonitrile, the components of the blend being so proportioned as to provide from 2 to 10 percent of the N-vinylpyrrolidone in polymeric form, based on the total weight of polymerized monomers in the blended polymer.

6. A dyeable fiber forming composition comprising a blend of polyacrylonitrile and a copolymer of 50 percent by weight of acrylonitrile and 50 percent of N-vinylpyrrolidone, the components of the blend being so proportioned that from 2 to 10 percent of the total monomers in polymeric form is N-vinylpyrrolidone.

7. A dyeable fiber forming composition comprising a blend of 70 to 98 percent by weight of a polymer of at least 75 percent by weight acryonitrile and up to 25 percent by weight of another polymerizable mono-olefinic monomer, and from 2 to 30 percent of a copolymer of from 30 to 90 percent by weight of N-vinylpyrrolidone and 10 to 70 percent acrylonitrile.

References Cited in the file of this patent

UNITED STATES PATENTS

| | | |
|---|---|---|
| 2,632,750 | Justice | Mar. 24, 1953 |
| 2,688,008 | Chaney | Aug. 31, 1954 |
| 2,723,254 | Chaney | Nov. 8, 1955 |
| 2,790,783 | Coover | Apr. 30, 1957 |

FOREIGN PATENTS

| | | |
|---|---|---|
| 1,005,596 | France | Dec. 26, 1951 |

OTHER REFERENCES

Hackh's: Chemical Dictionary (2nd edition) (1937), page 525.